(12) United States Patent
Rye et al.

(10) Patent No.: US 7,592,398 B1
(45) Date of Patent: Sep. 22, 2009

(54) FLEXIBLE POLYMER COATING AND COATED FLEXIBLE SUBSTRATES

(75) Inventors: Karen R. Rye, Cranberry Township, PA (US); Brian K. Rearick, Allison Park, PA (US); Michael L. Sproule, Cranberry Township, PA (US); Deborah E. Hayes, Verona, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 786 days.

(21) Appl. No.: 11/155,154

(22) Filed: Jun. 17, 2005

Related U.S. Application Data

(63) Continuation-in-part of application No. 10/871,716, filed on Jun. 18, 2004, now abandoned.

(51) Int. Cl.
*C08G 63/00* (2006.01)

(52) U.S. Cl. .................. 525/440.01; 525/437; 525/454; 528/48; 528/49; 528/81; 528/83; 528/84

(58) Field of Classification Search ................ 525/440, 525/437, 440.01, 454; 528/49, 48, 81, 83, 528/84
See application file for complete search history.

(56) References Cited

U.S. PATENT DOCUMENTS

| | | | | |
|---|---|---|---|---|
| 3,253,600 | A | * | 5/1966 | Scholl .......................... 36/141 |
| 4,380,591 | A | * | 4/1983 | Baskent et al. ............... 521/115 |
| 5,221,788 | A | | 6/1993 | Goto et al. |
| 6,162,891 | A | | 12/2000 | Wamprecht et al. |
| 6,423,816 | B1 | | 7/2002 | Wamprecht et al. |
| 6,458,898 | B1 | | 10/2002 | Wamprecht et al. |
| 6,734,273 | B2 | | 5/2004 | Onder |
| 2003/0165676 | A1 | * | 9/2003 | Zhou et al. .................. 428/353 |

FOREIGN PATENT DOCUMENTS

| | | | |
|---|---|---|---|
| GB | 1225259 | * | 3/1971 |
| WO | 02/36699 A | | 5/2002 |
| WO | WO 0236699 A1 | * | 5/2002 |

OTHER PUBLICATIONS

VELVECRON XPC30002, Technical Data Sheet, PPG Industries, Inc.

* cited by examiner

*Primary Examiner*—Randy Gulakowski
*Assistant Examiner*—Alicia M Toscano
(74) *Attorney, Agent, or Firm*—Diane R. Meyers

(57) ABSTRACT

A coating composition comprising a first component having a first polyester polyol having a first functionality, and a second polyester polyol having a second functionality, wherein the second functionality is greater than the first functionality, and a second component comprising an isocyanate, wherein the coating has an NCO:OH ratio of 1:1 or greater is disclosed. A coated flexible substrate comprising a flexible substrate, and a coating deposited on at least a portion of the substrate, wherein the coating comprises a first component having a first polyester polyol having a first functionality and a second polyester polyol having a second functionality, wherein the second functionality is greater than the first functionality and a second component comprising an isocyanate is also within the scope of the present invention.

30 Claims, No Drawings

FLEXIBLE POLYMER COATING AND COATED FLEXIBLE SUBSTRATES

CROSS-REFERENCE TO RELATED APPLICATION

This patent application is a continuation-in-part of U.S. patent application Ser. No. 10/871,716 filed Jun. 18, 2004 now abandoned.

FIELD OF THE INVENTION

The present invention relates generally to solvent-based flexible polymer coatings, and more specifically to coatings having a first polyester polyol having low functionality, a second polyester polyol having a functionality higher than the first polyester polyol, and an isocyanate. The present invention further relates to flexible substrates coated with these coatings.

BACKGROUND OF THE INVENTION

Many substrates, such as textiles, thermoplastic urethane, ethylene vinyl acetate foam and leather, have a significant amount of flexibility. It is often desirable to coat these substrates with a coating to improve appearance, water resistance, chemical resistance, scratch resistance, ultraviolet resistance and durability. Many coatings that improve these properties are rigid coatings suitable for use on rigid substrates. When a rigid coating, such as an acrylic coating, is applied to a flexible substrate, the coating will often crack and peel away from the substrate when the substrate is flexed. Accordingly, a flexible coating suitable for use on flexible substrates is desired.

Two-component ("2K") polyurethane coatings can be effective in protecting substrates from moisture, abrasion, corrosion, ultraviolet radiation and/or object impact. Polyurethane coatings are typically durable and have high tensile strength, and good chemical and solvent resistance. A polyurethane coating that can conform to a flexible substrate without cracking as the substrate is flexed is desired.

SUMMARY OF THE INVENTION

The present invention provides coating compositions comprising a first component comprising a first polyester polyol having a first functionality and a second polyester polyol having a second functionality, wherein the second functionality is greater than the first functionality, and a second component comprising an isocyanate, wherein the NCO:OH ratio of the coating is 1:1 or greater.

The present invention also provides flexible substrates coated with one or more of the coatings described above.

DETAILED DESCRIPTION

The present invention is directed to a 2K solvent-based polymer coating composition. The first component comprises a first polyester polyol having a first functionality and a second polyester polyol having a second functionality, wherein the second functionality is greater than the first functionality. "Functionality" refers to the number of hydroxyl groups per molecule of the polyol. "Polyol" refers to polyol and/or polyol composition. The second component comprises an isocyanate. The NCO:OH ratio of the coating composition is 1:1 or greater. "NCO:OH ratio" refers to the ratio of isocyanate groups to hydroxyl groups in the coating composition. It will be appreciated that the two components, when combined, produce a polyurethane coating.

In one embodiment, the difference between the hydroxyl numbers of the first polyester polyol and the second polyester polyol is at least 10. In another embodiment, the difference between the hydroxyl numbers of the first polyester polyol and the second polyester polyol is at least 20. In one embodiment, the first polyester polyol of the first component has a low functionality. As used herein, the term "low functionality" and like terms mean that the polyester polyol has a hydroxyl number of less than 65, such as less than 60. A suitable low functionality polyester polyol has a hydroxyl number of from 40 to 60. In one embodiment, the first polyester polyol has a hydroxyl number of from 54 to 58. The low functionality of the first polyester polyol results in increased flexibility and a lower tendency to form crosslinks when reacted with an isocyanate in a coating. Any polyester polyol having a low functionality can be used in the present invention. For example, the first polyester polyol can be the reaction product of a carboxylic acid and polyalcohol; such a product is commercially available as DESMOPHEN 1625A from Bayer Corporation.

In one embodiment, the second polyester polyol of the first component has a medium functionality. As used herein, the term "medium functionality" and like terms mean that the polyester polyol has a hydroxyl number of from 90 to 125. In one embodiment, the second polyester polyol has a hydroxyl number of from 104 to 118. The medium functionality of the second polyester polyol typically increases the crosslink density of the coating, resulting in increased coating hardness and improved chemical resistance. Any polyester polyol having medium functionality can be used in the present invention. For example, the second polyester polyol can be the reaction product of a polyol, an aromatic dicarboxylic acid and/or anhydride, and/or an aliphatic dicarboxylic acid and/or anhydride. The second polyester polyol can be the reaction product of isophthalic acid, phthalic anhydride, adipic acid, trimethylol propane, and 1,6 hexanediol; such a product is commercially available as DESMOPHEN 670 A-80 from Bayer Corporation. In certain embodiments, either one or both of the polyester polyols specifically exclude neopentyl glycol.

The first and second polyester polyols can be combined together to form a polyester polyol blend in the first component. In one embodiment, the ratio of the first polyester polyol to the second polyester polyol in the polyester polyol blend is from 5:1 to 8:1. In another embodiment, the ratio of the first polyester polyol to the second polyester polyol in the polyester polyol blend is from 6.5:1 to 7.5:1. The amount of the first polyester polyol and the amount of the second polyester polyol in the blend can be selected to optimize certain features of each polyol. For example, an increased amount of the first polyester polyol results in increased flexibility, while an increased amount of the second polyester polyol results in increased hardness and chemical resistance. One skilled in the art can determine the best ratio based upon these considerations depending on the needs of the user.

In one embodiment, the first polyester polyol, the second polyester polyol and an acrylic polyol can be combined to produce a first component. An acrylic polyol can be added to the polyester polyol blend in the first component in order to further increase the strength of the coating. In one embodiment, the acrylic polyol is a styrenated acrylic polyol. Examples of other suitable acrylic polyols include copolymers of methyl(meth)acrylate with hydroxy functional (meth)acrylate monomers, copolymers of isobornyl(meth)acrylate, ethyl (meth)acrylate copolymers, hydroxyl-ethyl (meth)acrylate, and hydroxyl-propyl methacrylate. The acrylic polyols can have functionality or be substantially non-functional. In one embodiment, acrylic polyols used in the present invention can have a hydroxyl number of at least 50. In one embodiment, acrylic polyols, such as styrenated acrylic polyols, can be added to the first component in an amount up to 40 weight percent.

The acrylic polyols can be provided in any amount desired to provide sufficient strength to the coating. The acrylic polyols will typically crosslink with isocyanate in the final coating, thereby increasing the crosslink density and hardness of the coating. Since increased amounts of acrylic polyol may increase the strength of the coating, but decrease the amount of flexibility, the desired amount of acrylic polyol must be determined based upon the needs of the user.

The second component of the two-component coating comprises an isocyanate. As used herein, the term "isocyanate" and like terms include isocyanate, polyisocyanates, and cyclic trimers of polyisocyanates. Suitable isocyanates include isophorone diisocyanate, 1,3- or 1,4-cyclohexane diisocyanate, dicyclohexylmethane diisocyanate, tetraalkylxene diisocyanates such as m-tetramethyl xylene diisocyanate, p-phenylene diisocyanate, polymethylene polyphenyl isocyanate, diphenylmethylene diisocyanate, 2,6-toluene diisocyanate, dianisdine diisocyanate, bitolylene diisocyanate, naphthalene-1,4-diisocyanate, bis(4-isocyanato phenyl) methane, 4,4'-diphenylpropane diisocyanate, hexamethylene diisocyanate, and, where appropriate, trimers thereof, such as an isocyanate trimer of hexamethylene diisocyanate.

The amount of polyester polyol blend, and acrylic polyol if used, in the first component and the amount of isocyanate in the second component can be selected such that the ratio of isocyanate groups to hydroxyl groups, i.e. NCO:OH, will produce a coating composition having an NCO:OH ratio of 1:1 or greater. "Greater than 1:1", "1:1 or greater", and like terms mean that the NCO component will be higher than the OH component. In certain embodiments, the NCO:OH ratio is greater than 1:1. In certain embodiments, the NCO:OH ratio is at least 1.2:1, such as greater than 1.2:1. In certain embodiments, the NCO:OH ratio is at least 1.4:1, such as greater than 1.4:1. In certain embodiments, the NCO:OH ratio is 1.7:1 or greater, such as 2:1 or greater. In general, the NCO:OH ratio can be 3:1 or lower, such as 2.5:1 or lower. It is surprising that the coatings of certain embodiments of the present invention, such as those having an NCO:OH ratio of greater than 1.2:1, exhibit improved flexibility. Conventional teachings indicate that coatings having higher NCO:OH ratios exhibit increased rigidity. In traditional polyurethane compositions, excess isocyanate groups (NCO groups) typically form side reactions with available amines, water and/or alcohols, and become rigid. Accordingly, it is surprising that a coating having a relatively high NCO:OH ratio as compared to traditional coatings has improved flexibility. It is further surprising that coatings according to certain embodiments of the present invention wherein the NCO:OH ratio is 1.2:1 or greater, such as 1.4:1 or greater, may have a Young's modulus and/or tensile strength typical for coatings having a lower NCO:OH ratio.

Various additives can be added to the coating in accordance with the present invention. Typically, these additives are added to the first component, but could be added to either or both components based upon the needs of the user. Examples of suitable additives include solvents such as acetates, alcohols, ketones, glycols, ethers, aliphatics, cycloaliphatics and aromatics. Examples of acetates include ethyl acetate, butyl acetate, and glycol acetate. Examples of ketones include methyl ethyl ketone and methyl-N-amyl ketone. Examples of aromatics are toluene, naphthalene and xylene. In one embodiment, one or more solvents are added to each of the first component and the second component. Suitable solvent blends can include, for example, one or more acetates, propanol and its derivatives, one or more ketones, one or more alcohols and/or one or more aromatics.

Other suitable additives include texture-enhancing additives such as silica or a paraffin wax to improve the surface feel of the coating and to enhance stain resistance. Other suitable additives can include those standard in the art, including but not limited to plasticizers, leveling agents, adhesion promoters, colorants, rheology modifiers, ultra-violet (UV) absorbers, and hindered amine light stabilizers (HALS).

The coatings of the present invention can also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt-type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions, division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,315 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Application Publication No. 2003/0125416, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions according to the present invention are suitable for producing any type of coating, and are particularly suitable as topcoats on substrates. In one embodiment, the coating of the present invention can be used as a single application coating or monocoat. In another embodiment, the coating can be used as one or more of a multiple application coating in which each coat may contain the same or different additives. The coatings of the present invention can be used alone or in combination with other coatings. In certain embodiments, it may be desirable to use an adhesion promoter layer on the substrate to be coated. Any suitable commercially available adhesion promoter can be used.

The present invention is also directed to a coated flexible substrate having a coating deposited on at least a portion of the substrate. The coating can be any of the coatings described above. The coating compositions obtained by mixing the two components has a limited potlife and can be applied to flexible substrates in any known manner such as brushing, spraying, rolling, roll coating, slot coating and/or dipping.

The curing of these coatings can comprise a flash at ambient or elevated temperatures followed by a thermal bake in order to obtain optimum properties. The coatings of the present invention are typically deposited on the flexible substrate to a thickness of from 0.1 to 3 mils. In one embodiment, the coating is deposited to a thickness of from 0.5 to 1.0 mils.

As used herein, the term "flexible substrate" refers to a substrate that can undergo mechanical stresses, such as bending or stretching and the like, without significant irreversible change. In certain embodiments, the flexible substrates are compressible substrates. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. Examples of flexible substrates includes non-rigid substrates, such as thermoplastic urethane (TPU), synthetic leather, natural leather, finished natural leather, finished synthetic leather, foam, polymeric bladders filled with air, liquid, and/or plasma, urethane elastomers, synthetic textiles and natural textiles. "Foam" can be a polymeric or natural material comprising open cell foam and/or closed cell foam. "Open cell foam" means that the foam comprises a plurality of interconnected air chambers; "closed cell foam" means that the foam comprises discrete closed pores. Example foams include but are not limited to polystyrene foams, polyvinyl acetate and/or copolymers, polyvinyl chloride and/or copolymers, poly(meth)acrylimide foams, polyvinylchloride foams, polyurethane foams, and polyolefinic foams and polyolefin blends. Polyolefinic foams include but are not limited to polypropylene foams, polyethylene foams and ethylene vinyl acetate ("EVA") foams. EVA foam can include flat sheets or slabs or molded EVA foams, such as shoe midsoles. Different types of EVA foam can have different types of surface porosity. Molded EVA can comprise a dense surface or "skin", whereas flat sheets or slabs can exhibit a porous surface. "Textiles" can include fabric, mesh, netting, cord, and the like, and comprises, for example, canvas, nylon, cotton, polyester, and the like. These lists are not meant to be exhaustive.

The flexible coatings of the present invention have a wide variety of applications. For example, the flexible substrate can be part of sporting equipment or apparel, such as athletic shoes, balls, bags, clothing and the like; an automotive interior component; a motorcycle component; household furnishings and decorations and the like. Surprisingly, when the coatings described herein were applied to rigid substrates and subjected to cure, the coating remained tacky and was readily marred.

Coatings of the present invention exhibit flexibility such that they are suitable for application onto flexible substrates. The present coatings do not readily crack when the substrates are manually flexed. Another benefit of the coatings of the present invention is that the coatings do not crack or peel when restrained in a flexed position for an extended period of time, such as up to three months.

In certain embodiments of the invention, the coatings described herein have an elongation to break of at least 50 percent, such as at least 100 percent. In one embodiment, the coating has an NCO:OH ratio of 1.4:1 and an elongation to break of greater than 100 percent. In one embodiment of the invention, a flexible substrate coated with a coating of the present invention has an elongation to break of at least 197 percent. As used herein, the term "elongation to break" means the percent strain in the tensile mode at the point at which specimen failure is observed. Higher elongation to break indicates more elongation of the specimen. Elongation to break can be determined, for example, using an Instron Mini 44 Unit equipped with a 50N load cell.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Thus, while reference is made throughout the specification to "a polyol", "an isocyanate", "a solvent", "a carboxylic acid and/or anhydride", "a polyalcohol", etc., combinations of such components can be used. Also, as used herein, the term "polymer" is meant to refer to oligomers and both homopolymers and copolymers, the prefix "poly" refers to two or more.

EXAMPLES

The following examples are intended to illustrate the invention and should not be construed as limiting the invention in any way.

TABLE 1

Compositional Information on 2K polyurethane formulations of the present invention

| | Example 1 | Example 2 | Example 3 | Example 4 |
|---|---|---|---|---|
| COMPONENT A | | | | |
| Polyester Polyol (a)[1] | 5.0 | 5.0 | 14.7 | 5.0 |
| Polyester Polyol (b)[2] | 0.85 | 0.85 | 2.0 | 0.85 |
| Acrylic Resin Solutions[3] | 1.17 | 1.17 | — | 1.17 |
| Pigmentation | 1.5 | 1.5 | — | 1.5 |
| Acrylic Polyol Solution[4] | — | — | 2.1 | — |
| Stabilizing Resin[5] | 0.85 | 0.85 | — | 0.85 |
| Non functional acrylic resins | 2.5 | 2.5 | 8.7 | 2.5 |
| UV stablizers/absorbers[6] | 0.2 | 0.2 | .92 | .20 |
| Tin Catalyst[7] | .02 | .02 | .02 | .02 |
| Bentone/Silicon Dioxide additives[8] | .07 | .07 | — | .07 |
| Polysiloxane additives[9] | .02 | .02 | .05 | .02 |
| Solvent[10] | 18.6 | 18.6 | 38.66 | 18.6 |
| Coating Solvent Reducer[11] | 61.5 | 61.5 | 22.1 | 61.5 |
| COMPONENT B | | | | |
| HDI Isocyanate[12] | 1.6 | 2.5 | 9.4 | 4.6 |
| Solvent Blend[13] | 7.0 | 4.0 | 1.5 | 3.1 |
| NCO/OH | 1.1 | 1.6 | 2.2 | 3.1 |

*% based on total weight (g) of component A and B combined.
*NCO/OH - (weight of isocyanate/equivalent weight)/(weight of polyester polyols/equivalent weight).
[1]DESMOPHEN 1652A - functional polyester commercially available from Bayer Corporation.
[2]DESMOPHEN 670A-80 - functional polyester commercially available from Bayer Corporation.
[3]Functional acrylic grind vehicle in concentrated tints.
[4]Functional acrylic polyol, PPG automotive clearcoat.
[5]CAB-531-1 and CAB-551-0.01 - cellulose acetate butyrate, which are commercially available from Eastman Chemical.
[6]TINUVIN 328 & TINUVIN 292, which are commercially available from CIBA Specialty Chemicals.
[7]DiButylTinDiLaurate, chemical accelerator.
[8]BENTONE 34, AEROSIL 200 - suspending agents commercially available from Elementis Specialities and Degussa Corporation.
[9]BAYSILONE OL17 - flow control additive, which is commercially available from Bayer Corporation.
[10]Solvents resins/additive solutions - toluene, n-butyl acetate, naphthalene, methyl ether propylene glycol acetate and mineral spirits.
[11]Various solvents - ethyl acetate, propylene glycol acetate, isopropanol, N-propoxypropanol, diacetone alcohol, xylene and toluene.
[12]DESMODUR N-3300 - hexamethylene polyisocyanate, which is commercially available from Bayer Corporation.
[13]Various solvents - N-butyl acetate, methyl ether propylene glycol acetate, methyl N-amyl ketone, diacetone alcohol and xylene.

To form component (A), polyester polyol (a) and polyester polyol (b) were mixed at constant low speed using a rotary stirrer at ambient temperature. Subsequently, N-butyl acetate, 10% tin catalyst solution (90%-methyl amyl ketone) and polysiloxane additive were added with agitation to the resin solution. Next, UV absorber/stabilizer solution and 2.6 g of the final solvent blend generally consisting of 11 to 12% methyl ethyl ketone, 70 to 75% glycol ketone and 17 to 18% toluene were added to produce a final clearcoat composition. The blend was stirred for 20 minutes at medium speed to assure full incorporation of components before continuing with the procedure.

In order to produce a copper-toned chrome appearance (Example 4), 13.9 g aluminum, 0.15 g carbon black and 0.26 g perrindo red acrylic-based concentrated tint along with 3.53 g copper pearl mica tint were premixed into the clearcoat using a mixing blade. Table 1 displays the weight percent acrylic and other tint additives used in Example 4. On average, the acrylic-based tints contain 29.360% binder, 29.04% pigment and 41.60% solvent. A small quantity of bentone (clay material) and silicon dioxide were also added to these tints to assure that no settling occurred. The aluminum tint includes 0.169 g Silberline STAR-BRITE 1150 vacuum-metallized aluminum having 1.28% pigment dispersed in 22.59% binder, cellulose acetate butyrate and non-functional methacrylate resin having 76.13% solvent ethyl/N-butyl acetate solvent blend. The sample was agitated for 20 minutes to complete the incorporation of the pigments into the resin system. Additions of 0.219 g tin catalyst solution (90%—methyl N-amyl ketone) and 0.133 g UV absorber solution (80%-N-butyl acetate/100 aromatic solvent) were added to Component A under agitation.

For Example 3, which contained functional and non-functional acrylic polyols, the acrylic polyol resin was mixed with the non-functional acrylic resin using a rotary stirrer at an ambient temperature at low speed. 6.41 g of various solvents consisting of ethyl acetate (13.2%), methyl N-amyl ketone (23.85%), glycol acetate (29.9%) and 100 aromatic solvent (33.07%) were added to the resin solution. Next, 0.43 g UV stabilizers/absorbers, 0.01 g 10% tin solution and 0.065 g of silicone additives were added. The blend was stirred for 20 minutes at medium speed to assure full agitation of the components, which were then stirred to the remainder of Component A.

The two-component polyurethane compositions were prepared by the following procedure: Component A (including the solvent reducer) was mixed with Component B isocyanate blend (including the solvent reducer shown in Table 1) in appropriate amounts to give the indicated NCO:OH ratio for 2 minutes to assure complete incorporation. The blended viscosity of the final coatings were measured at 15-25 seconds using #2 viscosity Zahn cup. The coatings were applied over a flexible substrate via a conventional Binks Model #7 gun at either an atomization pressure of 60-70 psi and low fluid flow, or an atomized pressure of 50-60 psi and medium fluid flow (Example 3). The coating was sprayed to cover the substrate to approximately 0.6 mils of film build thickness. A 10 minute flash at ambient temperature was preformed, followed by a thermal bake at 180° for 30 minutes (bake temperature dependent on type of flexible substrate). All coated substrates were conditioned at 72° F. and ambient humidity for 7 days prior testing to guarantee a fully cured coating.

The physical performances for Example 4 and Example 3 are shown in Tables 2 to 4 over a variety of flexible substrates. Both Examples 3 and 4 passed initial/final adhesion testing, 10-day humidity testing and flexibility testing over each type of flexible substrate: EVA foam, thermoplastic polyurethane laminated, finished natural leather, vinyl (PVA) and thermoplastic polyurethane. According to the standard test method ASTM D3359 test method B, all five coated substrates demonstrated a 5 classification on a scale of 0 to 5, indicating excellent adhesion onto the surface.

TABLE 2

Initial and Final Adhesion (ASTM D3359)

| SUBSTRATE | EVA FOAM | TPU Laminated | Finished Natural Leather | Vinyl (PVC) | TPU |
|---|---|---|---|---|---|
| Initial - EXAMPLE 4 | 5B | 5B | 5B | 5B | 5B |
| Final - EXAMPLE 4 | 5B | 5B | 5B | 5B | 5B |
| Initial - EXAMPLE 3 | 5B | 5B | 5B | 5B | 5B |
| Final - EXAMPLE 3 | 5B | 5B | 5B | 5B | 5B |

"B" refers to the test method B of ASTM Standard D3359 - lattice pattern cut through coating to substrate, pressure-sensitive tape applied and quickly removed.
The Numeric Value represents adhesion measured on a scale of 0 to 5:5 showing no delamination and 0 showing 100% adhesion loss.
Initial - samples tested after cure
Final - after 7 day post-cure As shown in Table 3, standard 10-day humidity testing was performed. The same adhesion test method was utilized for final adhesion performance after 10 day 100% relative humidity exposure. The results indicated no coating loss on the surface of each substrate for both samples. Again, both samples on all five substrates passed adhesion with a 5 classification.

TABLE 3

10 day Humidity Testing*

| SUBSTRATE | EVA FOAM | TPU Laminated | Finished Natural Leather | Vinyl (PVC) | TPU |
|---|---|---|---|---|---|
| EXAMPLE 4 | 5B | 5B | 5B | 5B | 5B |
| EXAMPLE 3 | 5B | 5B | 5B | 5B | 5B |

*Final Adhesion (ATSM D3359 test method B) Samples tested after 24 hours post-cure in humidity chamber for 10 days set at 100° F. and 100% relative humidity.
Adhesion tested 24 hrs. after removal from humidity chamber. Adhesion: ASTM D3359

As shown in Table 4, a flexibility bend test was performed on both samples over the five substrates. After a seven day post-cure, the substrate was manually bent to 180°. There were no indications of cracking or stripping of the coating from any substrate.

TABLE 4

Flexibility Bend Test*

| SUBSTRATE | EVA FOAM | TPU Laminated | Leather | Vinyl (PVC) | TPU |
|---|---|---|---|---|---|
| EXAMPLE 4 | No cracking | No cracking | No cracking | No cracking | No cracking |
| EXAMPLE 3 | No cracking | No cracking | No cracking | No cracking | No cracking |

*Samples tested seven days post-cured by manually bending to 180°. Coating was checked for cracking along the bent area.

The 2K polyurethane coating of Example 4 obtained exceptional film properties over thermoplastic polyurethane plastic. Table 5 contains detailed performance information on this flexible coating in Example 4 over thermoplastic urethane (TPU). According to the standard ASTM test method required for the pencil hardness test, final results displayed between HB-F hardness categories on a scale of 6HB-6H. A 2-minute spot exposure test was performed using three solvents—methyl ethyl ketone, ethanol and methanol. The chrome coating showed no signs of color or gloss variation. Another standard spot exposure test for 24 hours involved different common liquids such as olive oil, lemon juice, motor oil, hand cream, cola and coffee. All liquids passed observing no visible change in coating appearance. The taber abrasion test using Norman abrasion tester performed up to 75 cycles without complete coating loss to substrate. The standard alcohol resistance test passed at 50 double rubs of ethanol with no change in color or gloss. One significant physical test performed over the chrome coating was the flexibility test done over a three-month period. The coated TPU substrate was manually folded to 180° and restrained with a clip for a period of three months. At the conclusion of the three-month period, there were no signs of cracking or change of coating color/gloss over the period of time. Another test demonstrating flexibility involved impact resistance based on the standard test method in ASTM D2794-93. The failure end point was observed using 145 inch-pounds producing slight cracking at the center contact point.

TABLE 5

FILM PROPERTIES FOR CHROME MONOCOAT OVER THERMOPLASTIC POLYURETHANE

| PROPERTY | METHOD | RESULT |
| --- | --- | --- |
| Dry film thickness | Calibrated Electronic Film thickness meter | 0.4-1.0 mils, typical |
| Color | ASTM D1729 | Silver chrome |
| Gloss @ 60 | ASTM D523 | 55.6° |
| Pencil Hardness (Gouge) | ASTM D3363 Mitsubishi UNI pencils 6B-B, HB, F, H, 2H-6H (Soft through Hard) | 2H |
| Solvent Resistance | Spot resistance (2 minute exposure) MEK, Ethanol, Methanol, | Maximum variation of +/−5 Units. No visual change |
| Chemical Resistance | Spot Resistance (24 hr. exposure) Hand cream, olive oil, coffee, cola, lemon juice, motor oil, olive oil | Maximum variation of +/−5 Units. No visual change |
| Abrasion | Norman Abrader, RCA abrasion paper tape, 175 gram load | 120 cycles minimum, failure to substrate |
| Alcohol Resistance | Cotton cloth soaked in 95% ethanol; 500 gram weight with 1 cm² contact area; 50 double rub | No visible change in appearance |
| Flexibility Testing | Substrate bent back 180° in flex state for three months | No cracking, delamination, No visual chang |
| Impact Resistance | ASTM D2794-93 | Slight Cracking, delamination 145 inch-lbs |

The coating of Example 3 was prepared having three different NCO:OH ratios and tested after a 24 hour cure time. Sample A having an NCO:OH ratio of 5:1 was tested against a sample B having an NCO:OH ratio of and a sample C having an NCO:OH ratio of 0.5:1. Using standard techniques using Instron tensile testing equipment, these samples were tested to obtain the Young's Modulus, tensile strength, percent elongation and toughness as shown in Table 6.

TABLE 6

COATING PROPERTIES FOR COMPOSITIONS HAVING AN NCO:OH RATIO OF 5:1, 2.5:1 and 0.5:1 AFTER 24 HOUR CURE TIME

| Sample Composition | NCO:OH Ratio | Young's Modulus (MPa) | Tensile Strength (MPa) | Elongation (%) | Toughness (MPa) |
| --- | --- | --- | --- | --- | --- |
| Example 3 (A) | 5:1 | 60.7 ± 5.9 | 19.7 ± 1.4 | 105.8 ± 6.9 | 11.3 ± 1.2 |
| Example 3 (B) | 2.5:1 | 6.7 ± 0.7 | 4.9 ± 1.1 | 91.2 ± 23.6 | 2.5 ± 0.9 |
| Example 3 (C) | 0.5:1 | Cannot run, lacks film integrity | | | |

It is surprising that coatings of the present invention, having an NCO:OH ratio as high as 5:1, exhibit a tensile strength, Young's modulus and toughness that are typical for coatings having a significantly lower NCO:OH ratio, such as less than 1.7:1.

Examples 1-4 were coated over standard synthetic leather as described above, and further tested as shown in Table 7.

TABLE 7

| | Example 1 | Example 2 | Example 3 | Example 4 |
| --- | --- | --- | --- | --- |
| Cure time (@ 22° C.) | 1.5 hrs | 2 hrs | 3.5 hrs | 5 hrs |
| Bond Strength | 4 PLI | 4 PLI | 2 PLI | 1 PLI |
| Bally Flexibility | +200,000 cycles | +200,000 cycles | 150,000 cycles | 35,000 cycles |
| MEK double rubs (after 24 hrs) | +50 | +50 | 30 | <10 |

Cure time is measured as time necessary at 22° C. to gel - gel means that the coating is not pourable.
Bond Strength is an industry standard test and is a measure of the force necessary to rip the paint from the substrate, and is measured in PLI (pounds per linear inch).
Bally Flex, also an industry standard test, measures crack resistance using a Bally Flexometer. The more flexible the higher the number recorded.
MEK, also an industry standard test, resistance is a measure of solvent resistance.

Whereas particular embodiments of this invention has been described above for purposes of illustration, it will be evident to those skilled in the art that numerous variations of the details of the present invention may be made without departing from the invention as defined in the appended claims.

What is claimed is:

1. A coating composition comprising:
    a first component comprising: (i) a first polyester polyol having a first functionality and a hydroxyl number of from 40 to 60 and (ii) a second polyester polyol having a second functionality and a hydroxyl number of from 90 to 125, wherein the second functionality is greater than the first functionality; and
    a second component comprising an isocyanate, wherein the coating has an NCO:OH ratio of 1:1 or greater.

2. The coating composition of claim 1, wherein the difference between the hydroxyl number of the first polyester polyol and the hydroxyl number of the second polyester polyol is at least 10.

3. The coating composition of claim 1, wherein the difference between the hydroxyl number of the first polyester polyol and the hydroxyl number of the second polyester polyol is at least 20.

4. The coating composition of claim 1, wherein the first polyester polyol comprises the reaction product of a dicarboxylic acid and/or anhydride and a polyalcohol.

5. The coating composition of claim 1, wherein the second polyester polyol comprises the reaction product of a dicarboxylic acid and/or anhydride and a polyalcohol.

6. The coating composition of claim 1, wherein the second polyester polyol comprise a reaction production of isophthalic acid, phthalic anhydride, adipic acid, trimethylol propane, and 1,6 hexanediol.

7. The coating composition of claim 1, wherein the weight ratio of the first polyester polyol to the second polyester polyol is from 6.5:1 to 7.5:1.

8. The coating composition of claim 1, wherein the first component further comprises an acrylic polyol.

9. The coating composition of claim 8, wherein the acrylic polyol comprises up to 40 weight percent of the coating composition.

10. The coating composition of claim 1, wherein the coating has an NCO:OH ratio of 1.2:1 or greater.

11. The coating composition of claim 1, wherein the coating has an NCO:OH ratio of 1.4:1 or greater.

12. The coating composition of claim 1, wherein the coating has an NCO:OH ratio of 1.7:1 or greater.

13. The coating composition of claim 1, further comprising a texture enhancing additive.

14. The coating composition of claim 1, which, when cured, has an elongation to break of at least 50 percent.

15. The coating composition of claim 11, which, when cured, has an elongation to break greater than 100 percent.

16. A coated flexible substrate, comprising:
a flexible substrate, and
a coating deposited on at least a portion of the substrate, wherein the coating comprises:
a) a first component comprising: (i) a first polyester polyol having a first functionality and a hydroxyl number of from 40 to 60 and (ii) a second polyester polyol having a second functionality and a hydroxyl number of from 90 to 125, wherein the second functionality is greater than the first functionality; and
b) a second component comprising an isocyanate, wherein the coating has an NCO:OH ratio of 1:1 or greater.

17. The coated flexible substrate of claim 16, wherein the flexible substrate comprises a thermoplastic urethane, polyvinyl chloride, leather and/or ethylene vinyl acetate foam.

18. The coated flexible substrate of claim 16, wherein the elongation to break of the coated flexible substrate is greater than 100 percent.

19. The coated flexible substrate of claim 16, wherein the coating has a thickness of from 0.5 to 1.0 mils.

20. The coated flexible substrate of claim 16, wherein the difference between the hydroxyl number of the first polyester polyol and the hydroxyl number of the second polyester polyol is at least 10.

21. The coated flexible substrate of claim 16, wherein the difference between the hydroxyl number of the first polyester polyol and the hydroxyl number of the second polyester polyol is at least 20.

22. The coated flexible substrate of claim 16, wherein the weight ratio of the first polyester polyol to the second polyester polyol is from 5:1 to 8:1.

23. The coated flexible substrate of claim 16, wherein the first component further comprises an acrylic polyol.

24. The coated flexible substrate of claim 16, wherein the substrate is compressible.

25. The coated flexible substrate of claim 16, wherein the coating has an NCO:OH ratio of 1.2:1 or greater.

26. The coated flexible substrate of claim 16, wherein the coating has an NCO:OH ratio of 1.4:1 or greater.

27. The coated flexible substrate of claim 16, wherein the coating has an NCO:OH ratio of 1.7:1 or greater.

28. The coated flexible substrate of claim 16, wherein the coating further comprises a texture enhancing additive.

29. The coated flexible substrate of claim 17, wherein the flexible substrate comprises ethylene vinyl acetate foam.

30. The coated flexible substrate of claim 16, wherein the flexible substrate comprises a textile.

* * * * *